(12) United States Patent
Shibata

(10) Patent No.: US 10,379,789 B2
(45) Date of Patent: Aug. 13, 2019

(54) DATA MANAGEMENT SYSTEM THAT UPDATES A REPLICATION DATABASE, DATA MANAGEMENT APPARATUS, METHOD, AND STORAGE MEDIUM STORING PROGRAM

(71) Applicant: CANON KABUSHIKI KAISHA, Tokyo (JP)

(72) Inventor: Daisuke Shibata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/707,128

(22) Filed: Sep. 18, 2017

(65) Prior Publication Data

US 2018/0101335 A1    Apr. 12, 2018

(30) Foreign Application Priority Data

Oct. 6, 2016  (JP) ................................. 2016-198329

(51) Int. Cl.
| | |
|---|---|
| *G06F 15/00* | (2006.01) |
| *G06F 3/12* | (2006.01) |
| *G06F 3/06* | (2006.01) |
| *G06F 11/14* | (2006.01) |

(52) U.S. Cl.
CPC ............ *G06F 3/1205* (2013.01); *G06F 3/065* (2013.01); *G06F 3/067* (2013.01); *G06F 3/0619* (2013.01); *G06F 3/0643* (2013.01); *G06F 3/1229* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 2006/0218203 A1* | 9/2006 | Yamato | ............... G06F 11/2082 |
| 2015/0178030 A1* | 6/2015 | Kasahara | ............... G06F 3/1205 358/1.15 |

FOREIGN PATENT DOCUMENTS

| | | |
|---|---|---|
| JP | 2006268740 A | 10/2006 |
| JP | 2015121989 A | 7/2015 |

* cited by examiner

*Primary Examiner* — Henok Shiferaw
(74) *Attorney, Agent, or Firm* — Venable LLP

(57) ABSTRACT

After start of replication, backup data for restoring master data managed by a data management apparatus according to a restoration instruction is obtained. A content in the obtained backup data is designated as data for replication, and the data for replication is transmitted to an apparatus that is a replication destination. Data managed by the data management apparatus is restored using the obtained backup data.

15 Claims, 11 Drawing Sheets

DATA MANAGEMENT SYSTEM THAT UPDATES A REPLICATION DATABASE, DATA MANAGEMENT APPARATUS, METHOD, AND STORAGE MEDIUM STORING PROGRAM

BACKGROUND OF THE INVENTION

Field of the Invention

The present invention relates to data management systems, data management apparatuses, methods, and storage media storing programs that perform replication.

Description of the Related Art

For setting data for network devices, such as multifunction peripherals, etc., master data may be centrally stored and managed in another information processing apparatus, such as a management server, etc., that is connected to a network. These values are synchronized with each other. When a master data value is changed on the management server, a multifunction peripheral is notified of the changed value, and a setting data value is changed on the multifunction peripheral. Similarly, when a setting data value is changed on a multifunction peripheral, a master data value is changed on the management server (Japanese Patent Laid-Open No. 2015-121989). It is also known that, in order to maintain the integrity of the master data in the management server, the managed data is backed up at any suitable timings, and is restored at any suitable timings.

Meanwhile, known is a replication system that stores a duplicate copy of the master data of the management server in another server in case a trouble occurs in the management server and the system does not work. Japanese Patent Laid-Open No. 2006-268740 describes such a replication system in which the time it takes to duplicate the master data of the management server is reduced.

Backup is to store a state at a certain time of the management server, and backup data is not regularly updated. In contrast, replication is to mirror a current state, and therefore, when the data of the management server has been updated, replication data is regularly updated. The same system may have both the backup function and the replication function.

When one apparatus that is a database or the like stores master data while another apparatus performs replication with respect to the master data, backup master data may be restored. In such a case, data for replication representing differential information that is output for replication is not generated. As a result, the master data and the data in the replication destination become asynchronous with each other, i.e., appropriate replication cannot be performed.

SUMMARY OF THE INVENTION

An aspect of the present invention is to eliminate the above-mentioned problems with the conventional technology. The present invention provides a data management system, a data management apparatus, a method, and a storage medium storing a program that allow synchronization of data in a replication source with data in a replication destination even when restoration of master data is executed.

The present invention in one aspect provides a data management system including a first data management apparatus, and a second data management apparatus that stores data synchronous with master data managed by the first data management apparatus, wherein the first data management apparatus comprises: a memory device that stores a set of instructions; and at least one processor that executes the instructions to: start replication with respect to data stored in the second data management apparatus; obtain backup data for restoring the master data according to a restoration instruction, after the start of the replication; designate a content in the obtained backup data as data for replication, and transmit the data for replication to the second data management apparatus; and restore the master data using the obtained backup data, and the second data management apparatus comprises: a memory device that stores a set of instructions; and at least one processor that executes the instructions to: receive the transmitted data for replication; and replace the data stored in the second data management apparatus with the backup data on the basis of the received data for replication.

According to the present invention, data in a replication source and data in a replication destination can be synchronized with each other even when restoration of master data is executed.

Further features of the present invention will become apparent from the following description of exemplary embodiments with reference to the attached drawings.

DESCRIPTION OF THE EMBODIMENTS

Figure 1:
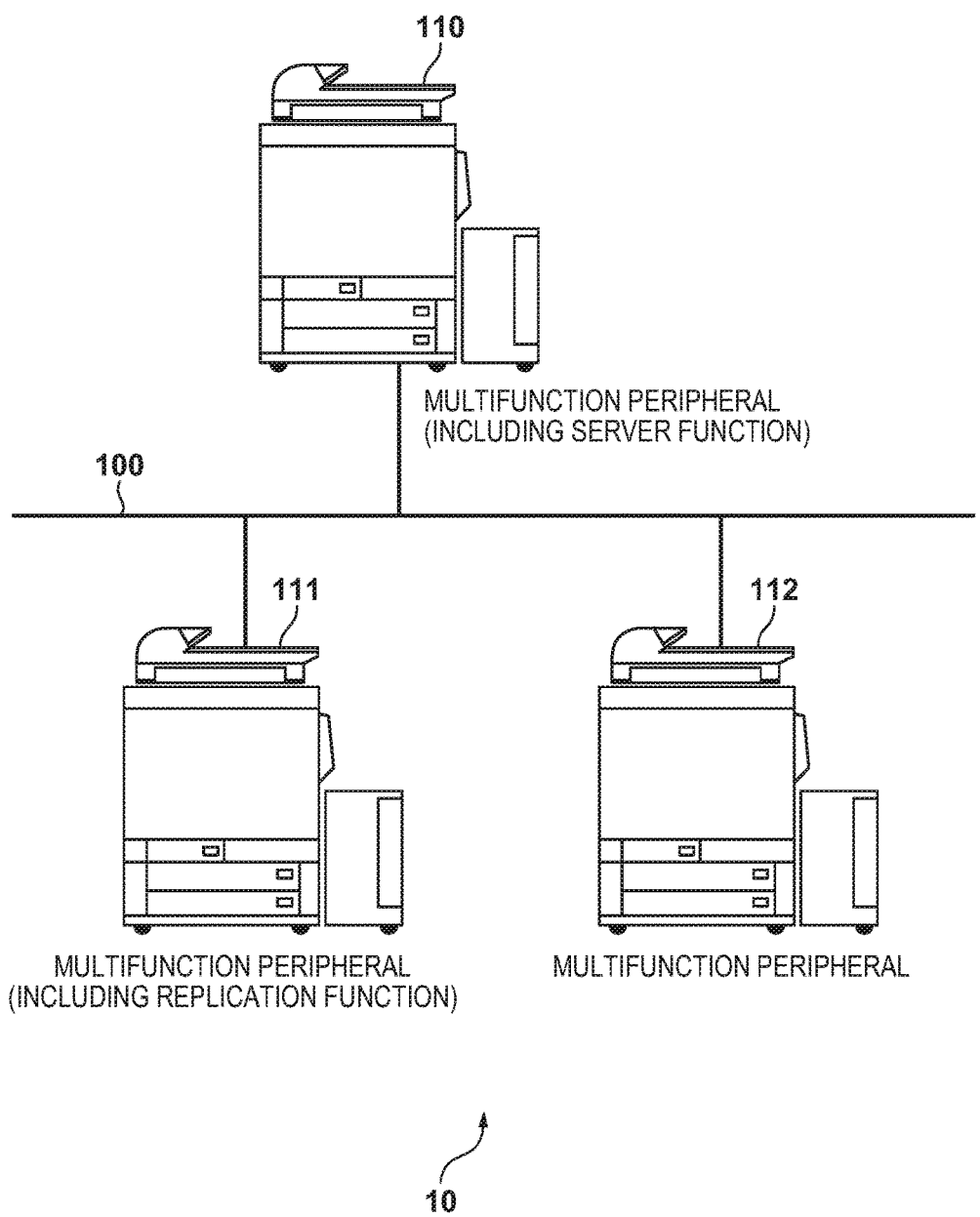
FIG. 1 is a diagram showing a system configuration.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same components are indicated by the same reference characters and will not be redundantly described.

(First Embodiment)

FIG. 1 is a system configuration diagram showing an entire data management system 10 according to this embodiment. As shown in FIG. 1, multifunction peripherals 110, 111, and 112 are connected together through a network 100 so that they can communicate with each other. Although FIG. 1 shows the three multifunction peripherals, the number of multifunction peripherals is not limited to three, if the multifunction peripherals perform data synchronization in this embodiment. The multifunction peripheral 110 has a server function, and can communicate with client terminals (hereinafter referred to as "clients") including itself (in FIG. 1, the multifunction peripherals 110, 111, and 112) through the network 100. The multifunction peripheral 110 uses the server function to manage various items of data in the multifunction peripherals 110, 111, and 112.

The multifunction peripheral 111 has a replication server function, and can communicate with the multifunction peripheral 110 through the network 100. The multifunction peripheral 110 uses the server function to replicate update information about various items of data managed, with respect to the multifunction peripheral 111 having the replication server function, which is designated as a replication destination.

The multifunction peripherals 110, 111, and 112, which are a client, each register information about itself into the server function of the multifunction peripheral 110 to participate in the data management system 10. In the data management system 10, each multifunction peripheral, when any of various items of data has been changed by execution of a process, such as a user's operation, copying, faxing, etc., sends information about the change to the multifunction peripheral 110 having the server function, and requests the multifunction peripheral 110 to update data. Each multifunction peripheral also sends a query about whether or not data managed by the server function has been updated, regularly or when necessary, and if there is updated data, obtains and stores that data into itself.

Although, in this embodiment, it is assumed that the server function is executed by the multifunction peripheral 110, the server function may be executed by another multifunction peripheral, or another apparatus, such as a PC, etc. Also, although it is assumed that the replication server function is executed by the multifunction peripheral 111, the replication server function may be executed by another multifunction peripheral, or another apparatus, such as a PC, etc. As a client, an apparatus other than the multifunction peripherals 110, 111, and 112 shown in FIG. 1 may be used. Also, although, in this embodiment, it is assumed that data managed by the multifunction peripheral 110 is a predetermined type of setting data (described below) stored in a multifunction peripheral, the type is not limited. Other types of setting data may be used.

Figure 2:
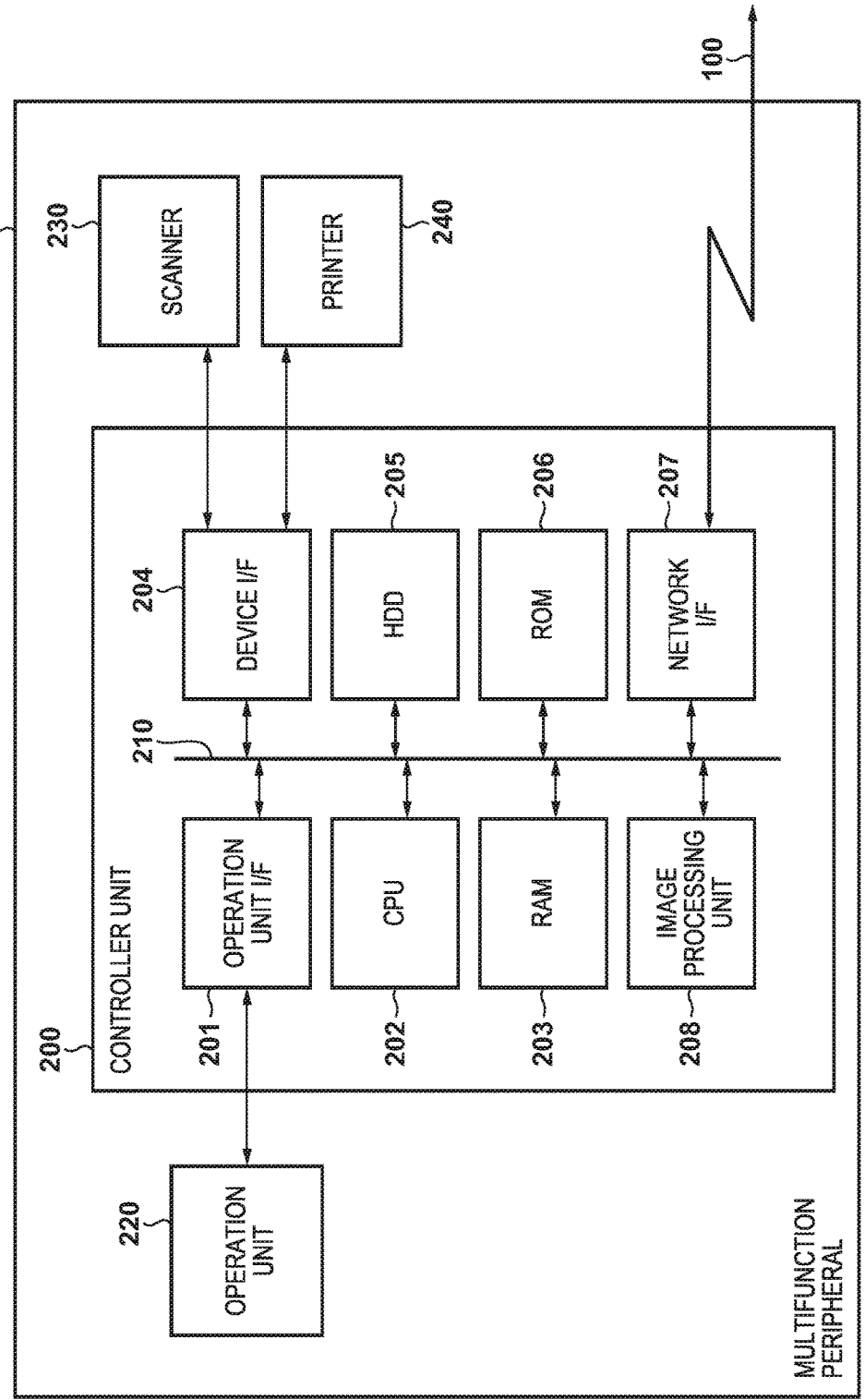
FIG. 2 is a diagram showing a block configuration in a multifunction peripheral.

FIG. 2 is a block diagram showing a configuration of the multifunction peripherals 110, 111, and 112. The multifunction peripherals 110, 111, and 112 have the same configuration. In the description that follows, the multifunction peripheral 110 is described as a representative example of the multifunction peripherals 110, 111, and 112.

The multifunction peripheral 110 includes a controller unit 200, an operation unit 220, a scanner 230, and a printer 240. The operation unit 220, and the scanner 230, which is an image input device, and the printer 240, which is an image output device, are coupled to the controller unit 200.

The controller unit 200, which has a CPU 202, centrally controls the multifunction peripheral 110. The CPU 202 starts an OS using a boot program stored in a ROM 206. The controller unit 200 executes an application program stored in, for example, an HDD 205, on the started OS, to carry out each operation of the multifunction peripheral 110. A RAM 203 is used as a work area for the CPU 202. The HDD 205 and the ROM 206 store application programs and various items of data. An operation of this embodiment is, for example, carried out by the CPU 202 reading a program stored in the HDD 205 or the ROM 206 into the RAM 203 and executing the program.

An operation unit interface (I/F) 201, which interfaces with the operation unit 220, sends display data to the operation unit 220, and sends information input by a user in the operation unit 220, to the CPU 202. The operation unit 220, which has a touchscreen, a hardware key, etc., receives a user's operation, and displays apparatus information or job progress information of the multifunction peripheral 110, various user interface screens, etc.

A device interface (I/F) 204, which is connected to the scanner 230 and the printer 240, is used to input and output a control signal or setting information for reading or recording. A network interface (I/F) 207, which is connected to the network 100, such as a LAN, etc., allows for communication with apparatuses on the network 100. An image processing unit 208 performs an image process, such as correction, image rotation, image compression, resolution conversion, color space conversion, grayscale conversion, etc., on read data input from the scanner 230, or image data to be output to the printer 240. A system bus 210 is used to couple the blocks in the controller unit 200 together.

The configuration of the multifunction peripheral 110 is not limited to that shown in FIG. 2. Any suitable block may be provided, corresponding to a function executable by the multifunction peripheral 110. For example, when a fax function or a box function can be executed, a block corresponding to that function is provided, and is controlled by the CPU 202.

Figure 3:
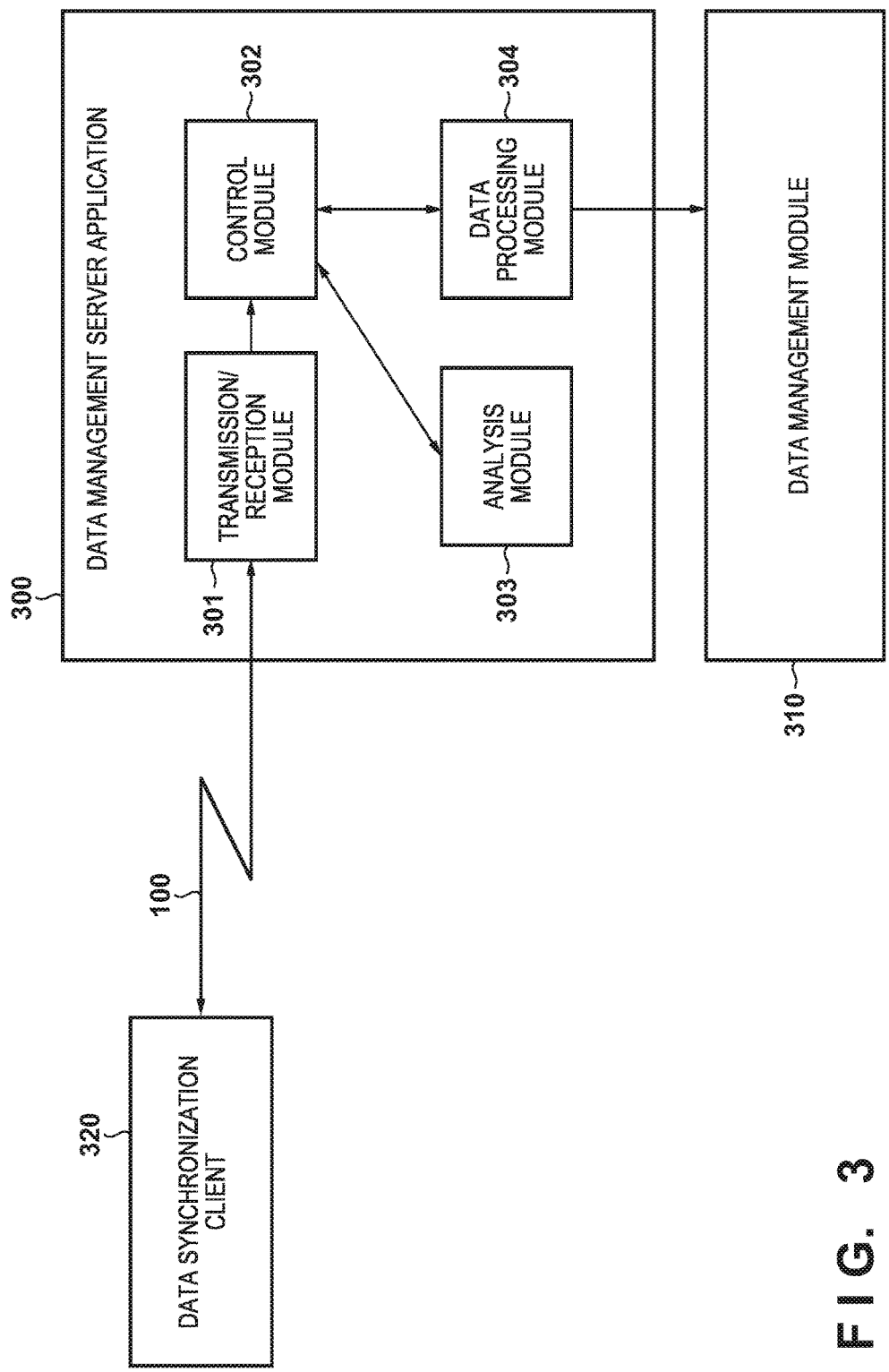
FIG. 3 is a diagram showing a block configuration of a data management server application.

FIG. 3 is a diagram showing a block configuration of a data management server application that carries out the server function executed by the multifunction peripheral 110. A data management server application 300 includes a transmission/reception module 301, a control module 302, an analysis module 303, and a data processing module 304. The data management server application 300 exchanges data with a data synchronization client 320 through the network interface (I/F) 207. The data synchronization client 320 operates on a multifunction peripheral that operates as a client with respect to the multifunction peripheral 110 having the server function.

The transmission/reception module 301 receives a process request or transmits a result of the process through the network interface (I/F) 207. The control module 302 controls execution of a process corresponding to a process request. The analysis module 303 analyzes a process request received by the transmission/reception module 301. The data processing module 304 produces, updates, deletes, or references data while communicating with a data management module 310 according to a process request received by the transmission/reception module 301. Data to be managed by the data management module 310 is stored in a storage unit, such as the HDD 205, the RAM 203, etc.

The data management server application 300, the data management module 310, and the data synchronization client 320 are stored in a storage unit that is one of the RAM 203, the HDD 205, and the ROM 206, and are executed by the CPU 202.

The data management server application 300 is used to manage "device base data," "device setting data," and "personalized data" of the setting data of the multifunction peripheral 110. The "device base data" is related to apparatus-specific device information, such as an apparatus identification number, a version, etc., of each multifunction peripheral registered in the data management system 10. The "device setting data" is related to apparatus setting information, such as network settings, settings for a printer operation, etc., of each multifunction peripheral. The "personalized data" is used by a user itself who uses each multifunction peripheral, such as a display language, a shortcut button, etc.

The data management server application 300 stores these items of setting data in a database (DB) included in the data management module 310, and temporarily provides a duplicate copy of the database of the data management module 310 to the multifunction peripheral 111 (initial replication). Thereafter, update information about a portion of data in the database of the data management module 310 is transmitted, as appropriate, to the multifunction peripheral 111, which in turn starts replication. In this embodiment, a case is described where replication is performed when data in the data management module 310 has been updated a predetermined number of times, or when a predetermined period of time has elapsed since the previous execution of replication, i.e., a case where asynchronous replication is executed.

The data management server application 300, when receiving an instruction to back up setting data as described above, executes a backup of the database stored in the data management module 310. The data management server application 300, when receiving an instruction to restore the backup database, executes a restoration of the database currently used in the data management module 310, using the backup data designated by the restoration instruction.

The device base data will now be described as an example of the setting data to be managed by the data management server application 300. Table 1 indicates the contents of a registered device management database that is used by the data management server application 300 to manage each individual multifunction peripheral for which data synchronization is performed. The registered device management database contains a device ID for uniquely identifying each multifunction peripheral for which data synchronization is performed, and an entity identifier for identifying the individual multifunction peripheral 110.

TABLE 1

| Registered device management DB | |
|---|---|
| Device ID | Entity identifier |
| 100001 | A1-AAAA |
| 100002 | A1-AAAB |
| 100003 | B1-AAAA |
| 100004 | B2-AAAA |
| 100005 | C1-AAAA |

Table 2 indicates the contents of a device base data item database of each individual multifunction peripheral, which is managed by the data management server application 300. The device base data item database contains an entity identifier for identifying each individual multifunction peripheral, a device type name, a firmware version, licenses indicating available functions, accessories, a synchronous working state indicating whether or not the entity is synchronous or is temporarily stopped, etc.

TABLE 2

| Device basic data item DB | |
|---|---|
| Attribute | Value |
| Entity identifier | A1-FFFF |
| Device type name | A |
| Version | V 1.01 |
| Licenses | Transmission |

TABLE 2-continued

| Device basic data item DB | |
|---|---|
| Attribute | Value |
| Accessories | High compression Setting value synchronization Finisher Optional cassette |
| Working state | Synchronous |

Figure 4:
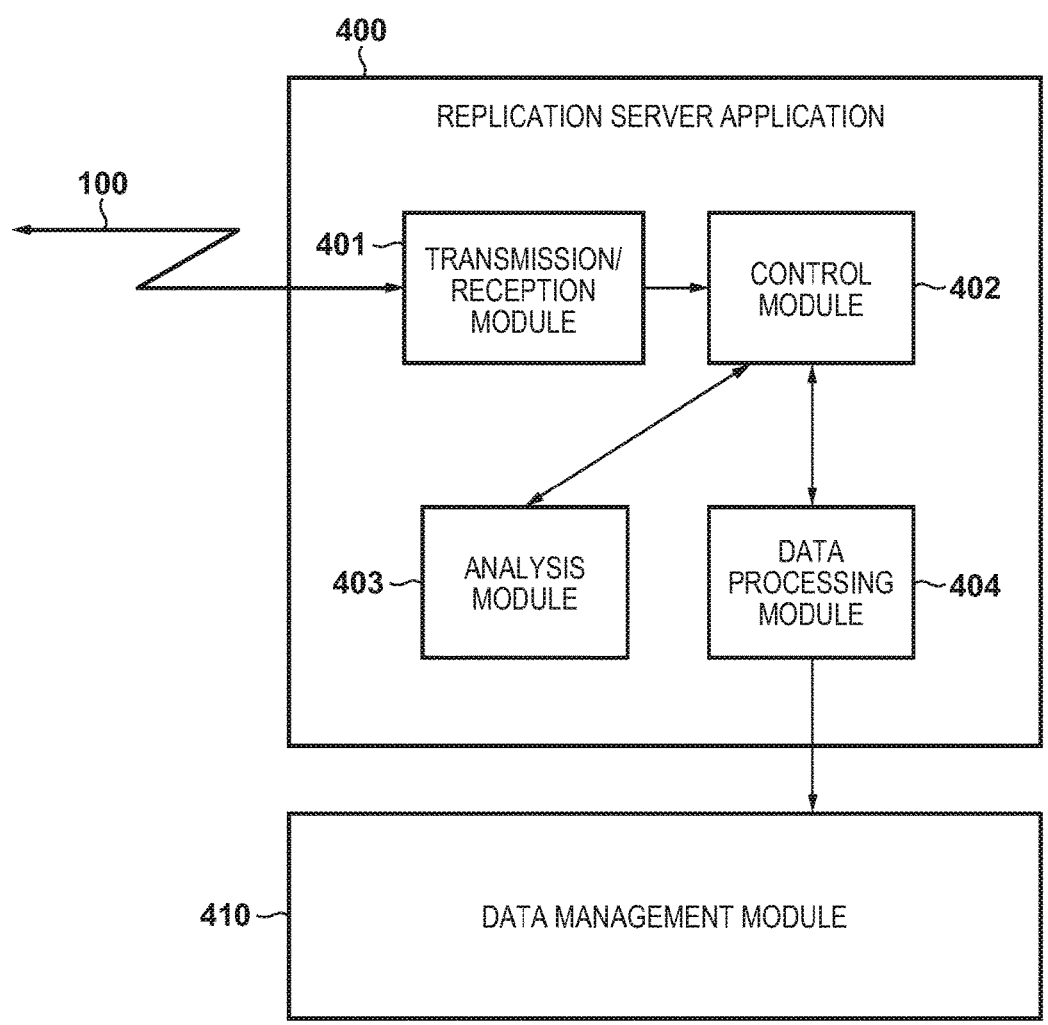
FIG. 4 is a diagram showing a block configuration of a replication server application.

In this embodiment, the multifunction peripheral 111, which is a replication destination, has the replication server function of managing a database (replication database) to be replicated. FIG. 4 is a diagram showing a block configuration of a replication server application 400 which carries out the replication server function. The replication server application 400 and a data management module 410 are stored in a storage unit that is one of the RAM 203, the HDD 205, and the ROM 206, and is executed by the CPU 202.

Backup is intended to store a state that is taken at a certain time. Therefore, in backup, backup data is produced at a timing when a user issues an instruction to produce backup data, and the produced backup data is not regularly updated. In contrast, replication is intended to mirror current data that is managed by the data management server application 300. Therefore, the replication data of the replication server application 400 is regularly updated.

The replication server application 400 includes a transmission/reception module 401, a control module 402, an analysis module 403, and a data processing module 404. The replication server application 400 exchanges data with the data management server application 300 through the network interface (I/F) 207.

The transmission/reception module 401 receives a process request or transmits a result of the process through the network interface (I/F) 207. The control module 402 controls execution of a process corresponding to a process request. The analysis module 403 analyzes a process request received by the transmission/reception module 401. The data processing module 404 produces, updates, deletes, or references data while communicating with the data management module 410 according to a process request received by the transmission/reception module 401. Data to be managed by the data management module 410 is stored in a storage unit, such as the HDD 205, the RAM 203, etc.

The replication server application 400, which is stored in a storage unit that is one of the RAM 203, the HDD 205, and the ROM 206 of the multifunction peripheral 111, is executed by the CPU 202. In this embodiment, the analysis module 403 of the replication server application 400 analyzes data for replication that is transmitted from the data management server application 300 for replication.

For example, when data for replication transmitted from the data management server application 300 is a database for initial synchronization of replication, the database of the data management module 410 is replaced with a database contained in the data for replication. Meanwhile, when the data for replication is differential data indicating a difference for replication, the database of the data management module 410 is updated on the basis of the content of the difference.

In the description that follows, it is assumed that the data management server application 300 that carries out the server function operates in the multifunction peripheral 110, and the multifunction peripherals 110, 111, and 112 are registered as clients. It is also assumed that the replication server application 400 that carries out the replication server function operates in the multifunction peripheral 111, and the multifunction peripheral 111 is designated as a replication destination for the server function of the multifunction peripheral 110. In addition, it is assumed that replication is performed on a database that contains master data.

Figure 5:
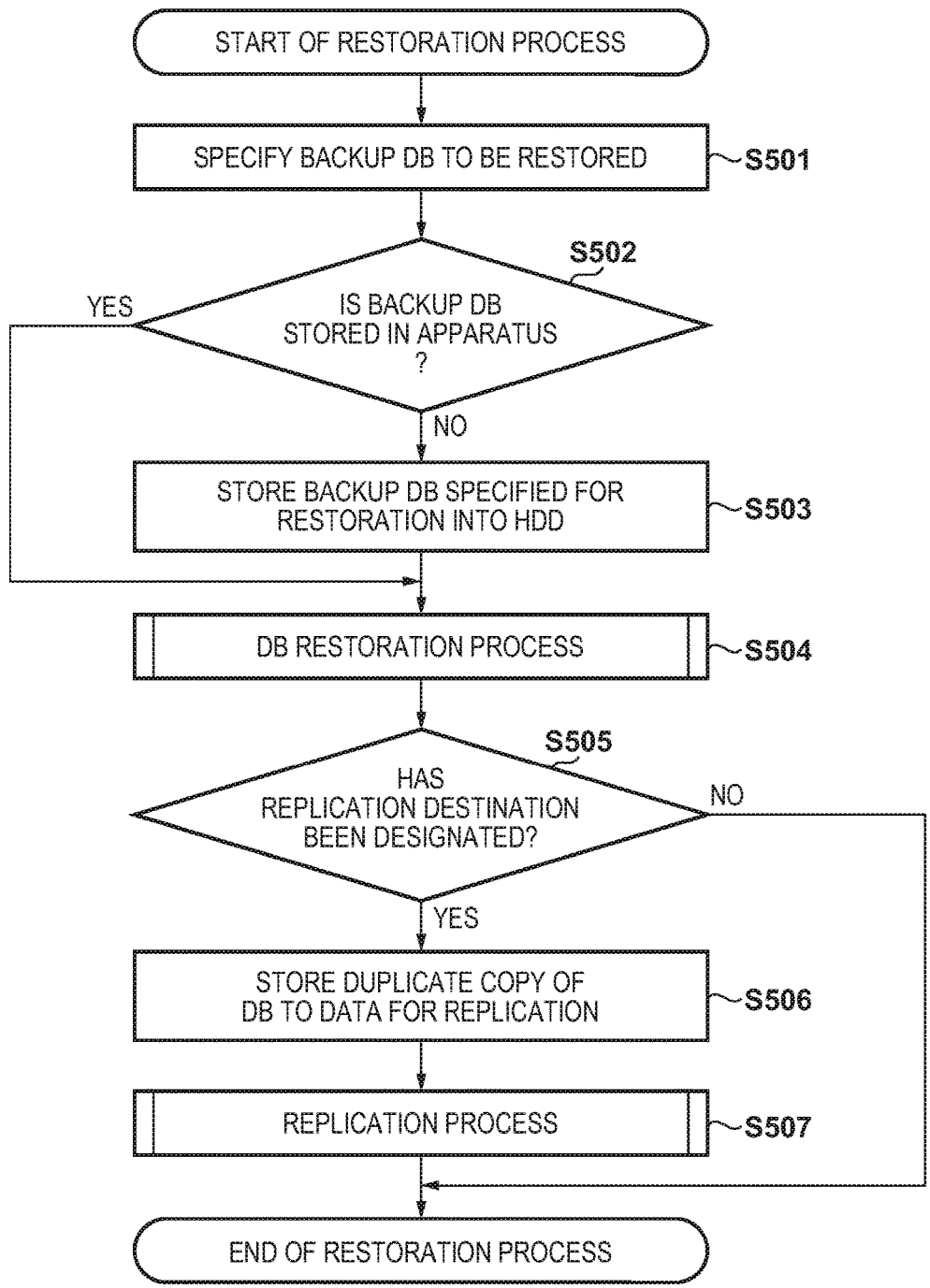
FIG. 5 is a flowchart showing an overview of an entire process including a restoration process.

FIG. 5 is a flowchart showing a process that is executed when the data management server application 300 receives a restoration instruction after having started replication. The process of FIG. 5 is carried out by, for example, the CPU 202 of the multifunction peripheral 110 reading a program stored in the HDD 205 or the ROM 206 into the RAM 203 and executing the program.

The process of FIG. 5 is started when the data management server application 300 receives a restoration instruction. Here, a backup database to be restored may be stored in the HDD 205 of the multifunction peripheral 110, in which the data management server application 300 operates, or in another multifunction peripheral, a file server, etc.

In step S501, the control module 302 specifies a backup database indicated by a restoration instruction. In step S502, the control module 302 determines whether or not the specified backup database is stored in the multifunction peripheral 110, in which the data management server application 300 operates. If it is determined that the specified backup database is stored in the multifunction peripheral 110, control proceeds to step S504. If it is determined that the specified backup database is not stored in the multifunction peripheral 110, control proceeds to step S503.

In step S503, the control module 302 requests the data processing module 304 to store the backup database specified in step S501 into the HDD 205 of the multifunction peripheral 110. The data processing module 304 obtains and stores the requested backup database into the HDD 205 through the data management module 310, and control proceeds to step S504.

In step S504, the control module 302 executes a database restoration process. The database restoration process is described with reference to FIG. 6. When the database restoration process ends, control proceeds to step S505.

In step S505, the control module 302 determines whether or not a replication destination has been designated with respect to the server function. If the determination result is positive, control proceeds to step S506. Otherwise, the process of FIG. 5 is ended.

In step S506, the control module 302 requests the data processing module 304 to designate data for replication. The data processing module 304, when there is differential data for replication for which replication has not been successful, deletes the differential data for replication. Here, the "differential data for replication for which replication has not been successful" refers to data indicating differential information that has not yet been replicated in a replication destination, although there had been a difference before the execution of the restoration process of step S504. Differential data is, for example, data for updating that is extracted from a binary log. The data processing module 304 produces a duplicate copy of a database file on which the restoration process has been performed, and designates and stores the duplicate copy of the data file as data for replication, and control proceeds to step S507.

When a duplicate copy of a database file on which the restoration process has been performed is produced and designated as data for replication, the data for replication may additionally contain information with which a replication destination can determine whether or not the data contained in the data for replication is differential data or a database. For example, the name of such a file may have a filename extension ".database" so that the file can be distinguished from differential data. Alternatively, flag information indicating whether a file is differential data or a database may be added to data for replication.

In step S507, the control module 302 executes a replication process. The replication process is described with reference to FIG. 7. When the replication process ends, the process of FIG. 5 is ended.

Figure 6:
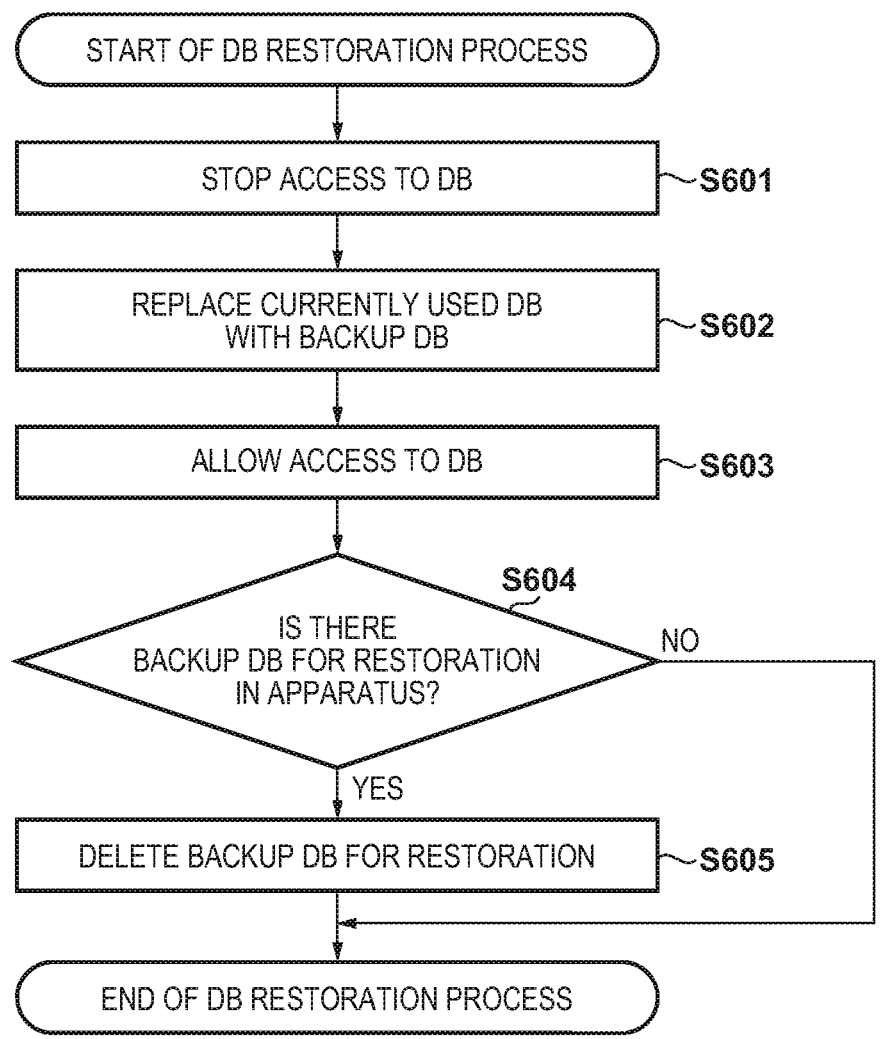
FIG. 6 is a flowchart showing a restoration process.

FIG. 6 is a flowchart showing the database restoration process of step S504 of FIG. 5. In step S601, the control module 302 requests the data processing module 304 to perform database locking so that a database managed by the data management module 310 cannot be accessed by others. After the data processing module 304 performs database locking so that a database cannot be changed, control proceeds to step S602.

In step S602, the control module 302 requests the data processing module 304 to replace a currently used database managed by the data management module 310 with the backup database specified by step S501. The data processing module 304 replaces the currently used database with the backup database, and control proceeds to step S603. In step S603, the control module 302 requests the data processing module 304 to release the database locking of the database. The data processing module 304 releases the database locking, and control proceeds to step S604.

In step S604, the control module 302 checks whether or not there is a backup database that remains in the multifunction peripheral 110. If the determination result is positive, control proceeds to step S605. Otherwise, the process of FIG. 6 is ended.

In step S605, the control module 302 requests the data processing module 304 to delete the remaining backup database. The data processing module 304 deletes the backup database from the HDD 205 through the data management module 310, and the process of FIG. 6 is ended.

Figure 7:
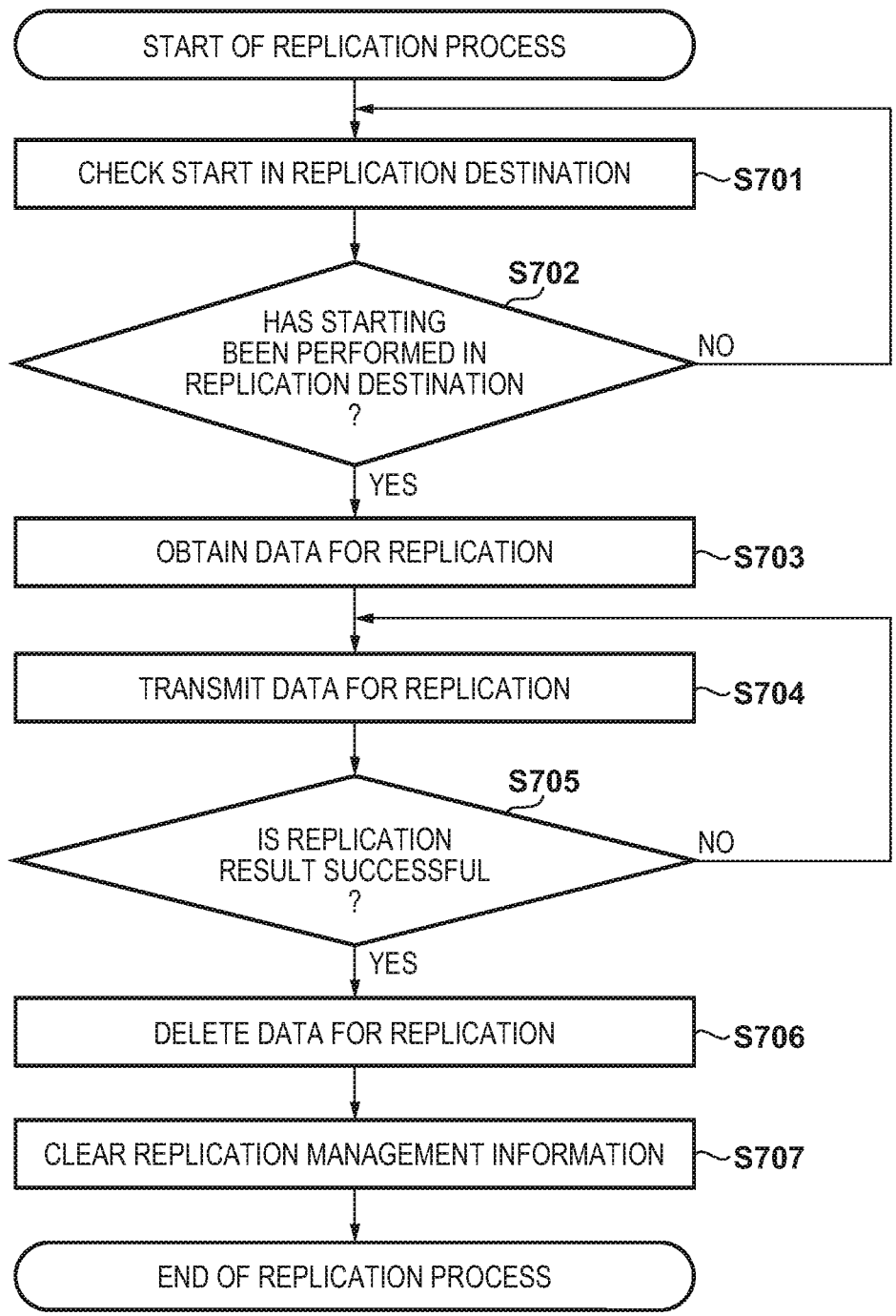
FIG. 7 is a flowchart showing a replication process.

FIG. 7 is a flowchart showing the replication process of step S507 of FIG. 5. In step S701, the control module 302 requests the transmission/reception module 301 to send, to the replication server application 400 of the multifunction peripheral 111, which has been designated as a replication destination, a query about whether or not the replication server application 400 has been started. The transmission/reception module 301 transmits the query to the replication server application 400 of the multifunction peripheral 111. When the transmission/reception module 301 receives a result of the query, control proceeds to step S702.

In step S702, the control module 302 determines whether or not the replication server application 400 has been started, on the basis of a response from the replication server application 400 that indicates the result of the query. If the determination result is positive, control proceeds to step S703. Otherwise, step S701 and following steps are repeated to check whether or not the replication server application 400 has been started. Here, for example, if the determination that the replication server application 400 has not yet been started is made any suitable number of times, the replication process may be executed again after a predetermined time has elapsed, or the operation unit 220 may be notified of the failure of the replication process, and the process of FIG. 7 may be ended.

In step S703, the control module 302 requests the data processing module 304 to obtain data for replication. The data processing module 304 obtains data for replication through the data management module 310, and control proceeds to step S704.

In step S704, the control module 302 instructs the transmission/reception module 301 to transmit the data for replication obtained in step S703. The transmission/reception module 301 transmits the data for replication obtained by the data processing module 304 to the replication server application 400, and control proceeds to step S705.

In step S705, the transmission/reception module 301 receives a response indicating a replication result from the replication server application 400. The control module 302 determines whether or not the received response indicates that the replication has been successful. If the determination result is positive, control proceeds to step S706. Otherwise (i.e., the replication has failed), step S704 and following steps are repeated so that the data for replication is transmitted. Here, the processes may be switched, depending on the result of the replication communication. For example, if it has been determined that the failure of the transmission may be due to a timeout error, a server-busy error, etc., and therefore, if the data for replication is transmitted again, the transmission can be successful, step S704 and following steps may be repeated after a predetermined time has elapsed. If it has been determined that, for example, a data analysis error has occurred a plurality of times, and therefore, even if the data for replication is transmitted again, the transmission cannot possibly be successful, the operation unit 220 may be notified of the failure of the replication process, and the process of FIG. 7 may be ended.

In step S706, the data processing module 304 deletes the data for replication through the data management module 310, and control proceeds to step S707. In step S707, the control module 302 initializes replication management information. The replication management information is, for example, about the number of times a database has been updated since the previous successful replication, and the period of time that has elapsed since the previous successful replication. In step S707, the control module 302 initializes the replication management information by, for example, rewriting the number of times a database has been updated since the previous successful replication, and the period of time that has elapsed since the previous successful replication, to zero. Thereafter, the control module 302 updates a last successful replication time contained in the replication management information with the current time, and the process of FIG. 7 is ended.

Figure 8:
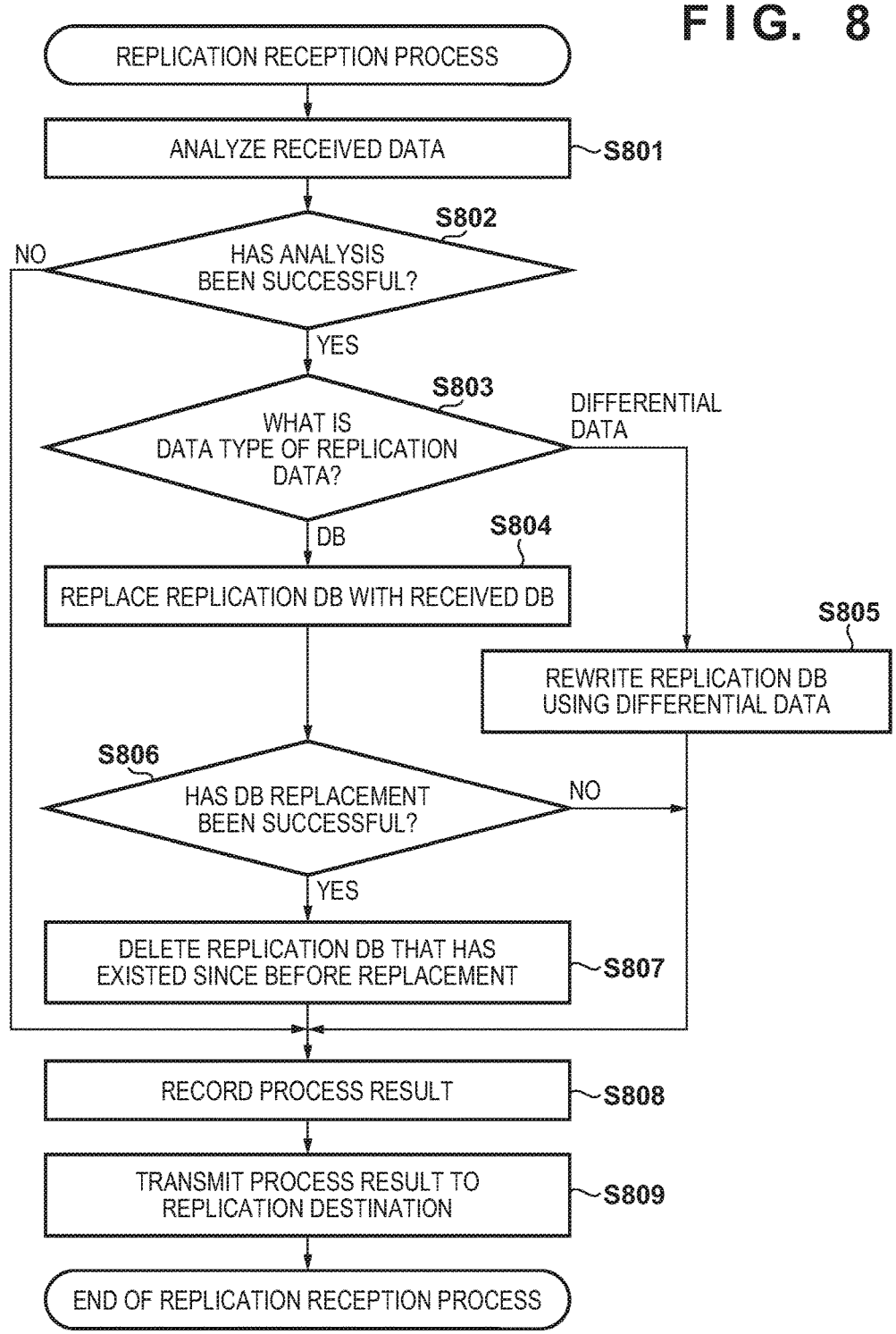
FIG. 8 is a flowchart showing a process which is executed when a replication process is received.

FIG. 8 is a flowchart showing a process that is executed when the replication server application 400 receives a replication request from the data management server application 300. The process of FIG. 8 is carried out by, for example, the CPU 202 of the multifunction peripheral 111 reading a program stored in the HDD 205 or the ROM 206 into the RAM 203 and executing the program. The process of FIG. 8 is started when the replication server application 400 receives a replication request (data for replication).

In step S801, the transmission/reception module 401, when receiving a replication request, notifies the control module 402 of the reception. The control module 402 instructs the analysis module 403 to analyze the received data for replication. The analysis module 403 checks the data format of the received data for replication to determine the data type.

In this embodiment, the analysis module 403 may check, for example, a filename, and if the filename contains ".database", determine that the data type is a database. Alternatively, the analysis module 403 may check flag information contained in a predetermined area of data for replication, and if the flag information indicates a database, determine that the data type is a database. Alternatively, the analysis module 403 may check the data size of data for replication, and if the data size is greater than or equal to a threshold value, determine that the data type is a database. Alternatively, the analysis module 403 may check the presence or absence of information indicating that updating has been performed after a predetermined time, in data for replication, and determine that the data type is differential data if the information has been detected, and that the data type is a database if the information has not been detected. Alternatively, other suitable techniques of determining the data type may be used. For example, when the above filename, flag information, data size, or information has failed to be checked or appropriately obtained, the analysis module 403 notifies the control module 402 that the analysis has failed.

The analysis module 403 notifies the control module 402 of the analysis result and the data type, and control proceeds to step S802. In step S802, the control module 402 determines whether or not the analysis result is successful. If the determination result is positive, control proceeds to step S803. Otherwise, control proceeds to step S808, in which the failure of the analysis is recorded as a result of the process.

In step S803, the control module 402 determines whether or not the data type of which the control module 402 has been notified is a database or differential data. If it has been determined that the data type is a database, control proceeds to step S804. If it has been determined that the data type is differential data, control proceeds to step S805.

In step S804, the control module 402 requests the data processing module 404 to replace a currently used replication database managed by the data management module 410 with a backup database contained in the received data for replication. The data processing module 404 executes a process of replacing the currently used replication database with the backup database. The data processing module 404 notifies the control module 402 of a result of the replacement process, and control proceeds to step S806.

Meanwhile, in step S805, the control module 402 requests the data processing module 404 to rewrite the currently used replication database managed by the data management module 410, using the differential data contained in the received data for replication. The data processing module 404 executes a process of updating the replication database using the differential data. The data processing module 404 notifies the control module 402 of a result of the updating process, and control proceeds to step S808.

In step S806, the control module 402 determines whether or not the result of the process of step S804 is successful or unsuccessful. If it has been determined that the process result is successful, control proceeds to step S807. If it has been determined that the process result is unsuccessful, the control module 402 is notified of the failure of the replacement, and control proceeds to step S808.

In step S807, the control module 402 instructs the data processing module 404 to delete the replication database that has existed since before the replacement. The data processing module 404 deletes the replication database that has existed since before the replacement, from the HDD 205, through the data management module 410, and notifies the control module 402 that the replacement is successful, and control proceeds to step S808.

In step S808, the control module 402 records a result of the process that the control module 402 has requested the data analysis module 403 or the data processing module 404 to execute, as a result of the replication process, and control proceeds to step S809. In step S809, the control module 402 notifies the transmission/reception module 401 of the process result recorded in step S808. The transmission/reception module 401 transmits the process result to the replication source, and the process of FIG. 8 is ended.

Thus, in this embodiment, when the data management server application 300 executes a restoration process in a situation where a replication destination has been designated, a database on which the restoration process has been completed is replicated in the replication destination. As a result, a consistency can be maintained between a database in the data management server application 300 on which a restoration process has been executed, and a replication database in the replication server application 400.

When asynchronous replication is executed, and the number of times data has been updated has not reached a predetermined value, a difference temporarily occurs between the databases of the data management server application 300 and the replication server application 400. In this case, in this embodiment, differential data on which a restoration process has not been executed and which has not been replicated is not replicated, and a database on which a restoration process has been executed is replicated. As a result, a situation where differential data on which a restoration process has not been executed and which has not been replicated is replicated, is avoided, and a database on which a restoration process has been executed is synchronized as described above, and therefore, subsequent replication can be appropriately performed. When it is necessary to replicate differential data on which a restoration process has not been executed and which has not been replicated, the differential data may be transmitted as update information in subsequent replication.

(Second Embodiment)

In this embodiment, another feature of the replication process in a case where restoration is executed in a situation where replication is being executed in the data management server application 300, will be described. In this embodiment, a backup database for which a restoration instruction is issued is duplicated in the replication server application 400, and thereafter, a restoration process is executed. Differences between the first and second embodiments will now be described.

Figure 9:
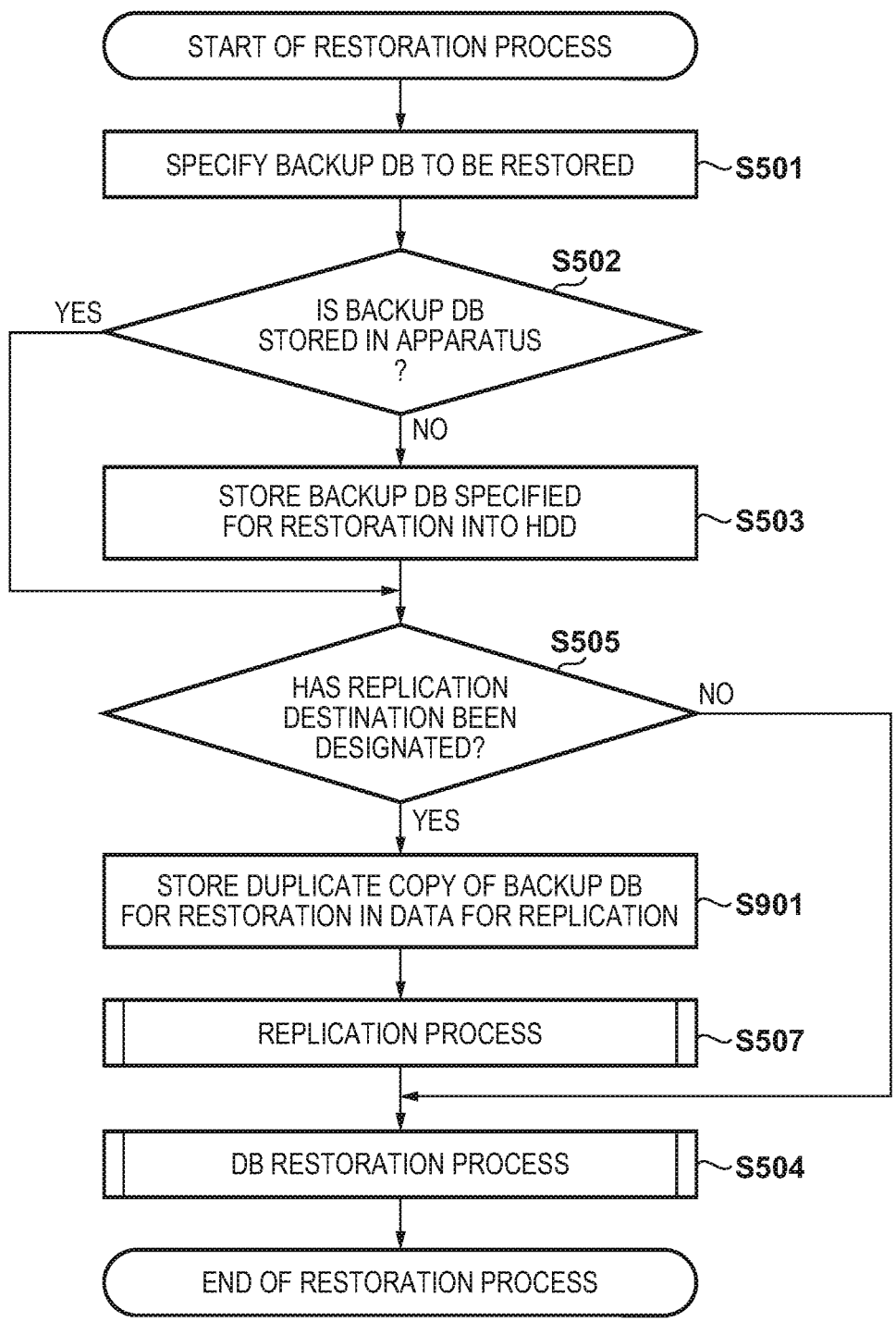
FIG. 9 is a flowchart showing an overview of an entire process including a restoration process.

FIG. 9 is a flowchart showing a process that is executed when the data management server application 300 receives a restoration instruction after having started replication. The process of FIG. 9 is carried out by, for example, the CPU 202 of the multifunction peripheral 110 reading a program stored in the HDD 205 or the ROM 206 into the RAM 203 and executing the program. The process of FIG. 9 is started when the data management server application 300 receives a restoration instruction.

Steps S501-S503 of FIG. 9 are as described above with reference to FIG. 5, and therefore, will not be described. In this embodiment, when it has been determined in step S502 that the specified backup database is stored in the multifunction peripheral 110, control proceeds to step S505 after step S503.

In step S505, the control module 302 determines whether or not a replication destination has been designated for the server function. If the determination result is positive, control proceeds to S901. Otherwise, control proceeds to step S504.

In step S901, the control module 302 requests the data processing module 304 to designate data for replication. When there is differential data for replication for which replication has not been successful, the data processing module 304 deletes the differential data for replication. Thereafter, the data processing module 304 produces a duplicate copy of a database file of a backup database specified in step S501, and designates and stores the duplicate copy as data for replication, and control proceeds to step S507. The designation of data for replication is performed in a manner similar to that described for step S506 of the first embodiment.

In step S507, the replication process described with reference to FIG. 7 is executed as in the first embodiment. After the execution of the replication process, control proceeds to step S504. In step S504, as in the first embodiment, the database restoration process described with reference to FIG. 6 is executed. When the database restoration process ends, the process of FIG. 9 is ended.

As described above, after a backup database for which an instruction to execute a restoration process has been issued is duplicated by replication executed by the replication server application 400, the restoration process is executed. Although, in the foregoing, the restoration process of step S504 is executed after step S507, the restoration process of step S504 may be executed after transmission of data to the replication server application 400 and before reception of a result in step S507. As a result, a restoration process is executed in parallel with transmission of data for replication, and therefore, processing efficiency can be improved.

(Third Embodiment)

In some cases, information about a physical configuration of the multifunction peripheral 110 that has synchronous data has been changed at a time when the data management server application 300 executes a restoration process. In this case, if a restoration process is executed, the physical configuration information of the multifunction peripheral 110, and the device base data of the data management server application 300, become inconsistent with each other. If a restoration process is executed using a backup database that has been replaced with the device base data that has been stored since before the restoration process, the above inconsistent state can be eliminated. However, the content of the database after the restoration process is not replicated, and therefore, an inconsistency with a replication destination occurs.

A feature of a replication process that is executed when the data management server application 300 updates the device base data in a restoration process in order to prevent or reduce the above inconsistent state, will now be described. Differences from the above embodiments will now be described.

Figure 10:
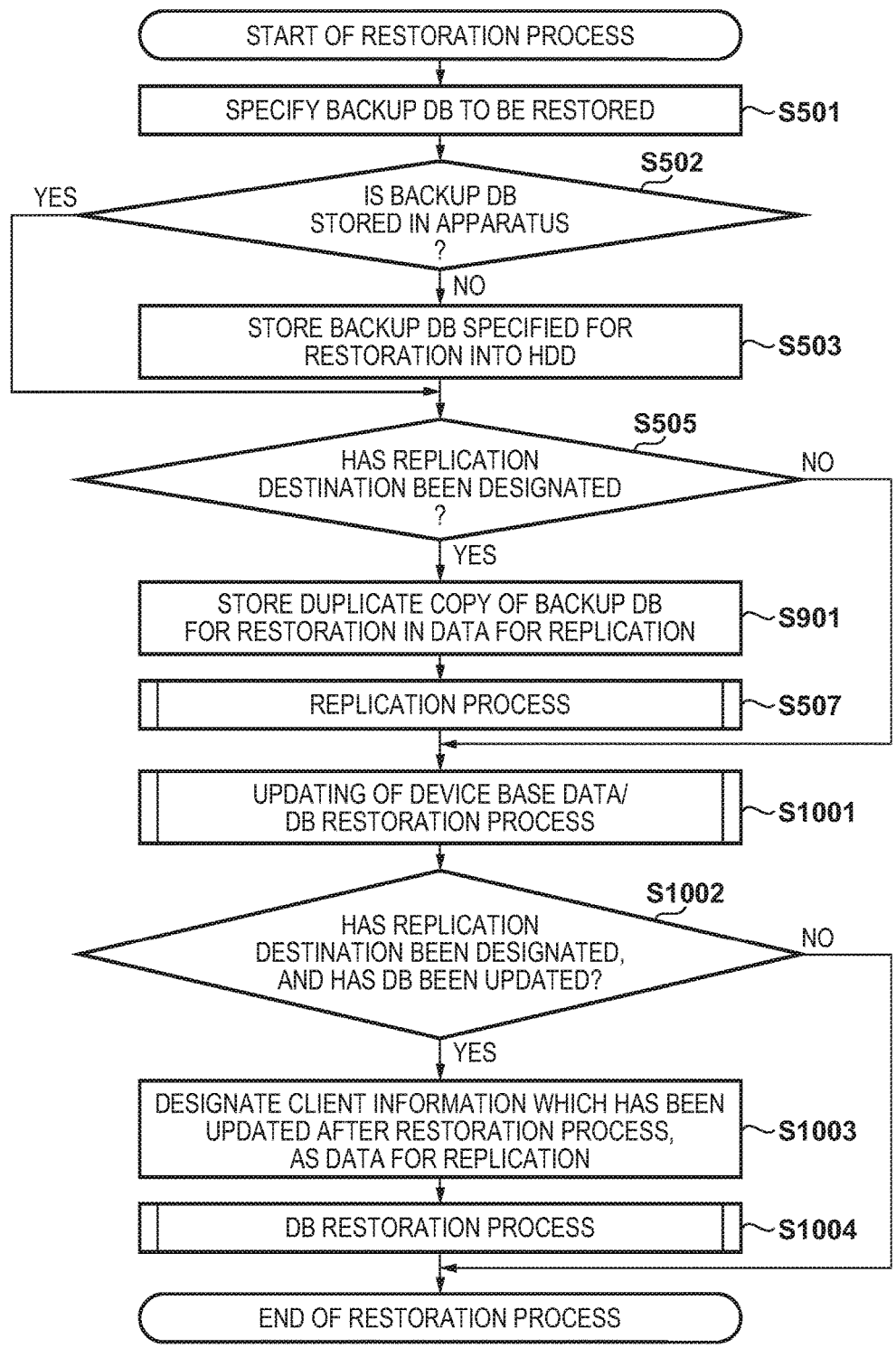
FIG. 10 is a flowchart showing an overview of an entire process including a restoration process.

FIG. 10 is a flowchart showing a process that is executed when the data management server application 300 receives a restoration instruction after having started replication. The process of FIG. 10 is carried out by, for example, the CPU 202 of the multifunction peripheral 110 reading a program stored in the HDD 205 or the ROM 206 into the RAM 203 and executing the program. The process of FIG. 10 is started when the data management server application 300 receives a restoration instruction.

Steps S501-S505 of FIG. 10, and step S901 and step S507, are as described with reference to FIGS. 5 and 9, and therefore, will not be described. In this embodiment, when it has been determined in step S505 that a replication destination has not been designated, control proceeds to step S1001 after step S507.

In step S1001, the control module 302 updates the device base data, and executes a database restoration process. The updating of the device base data and the database restoration process are described with reference to FIG. 11. After the updating of the device base data and the database restoration process end, control proceeds to step S1002.

In step S1002, the control module 302 determines whether or not a replication destination has been designated for the server function. Furthermore, the control module 302 determines whether or not a database has been updated in step S1001. If it has been determined in step S1002 that a replication destination has been designated and a database has been updated, control proceeds to step S1003. Otherwise, the process of FIG. 10 is ended. For example, if it has been determined that a replication destination has not been designated or a database has not been updated, the process of FIG. 10 is ended.

In step S1003, the control module 302 requests the data processing module 304 to obtain updated data of the database that has not yet been replicated. The data processing module 304 obtains data that has been updated after the replication process of step S507, as differential data, from the data management module 310, and designates the differential data as data for replication, and control proceeds to step S1004.

In step S1004, as in the first embodiment, the replication process described with reference to FIG. 7 is executed. When the replication process ends, the process of FIG. 10 is ended.

Figure 11:
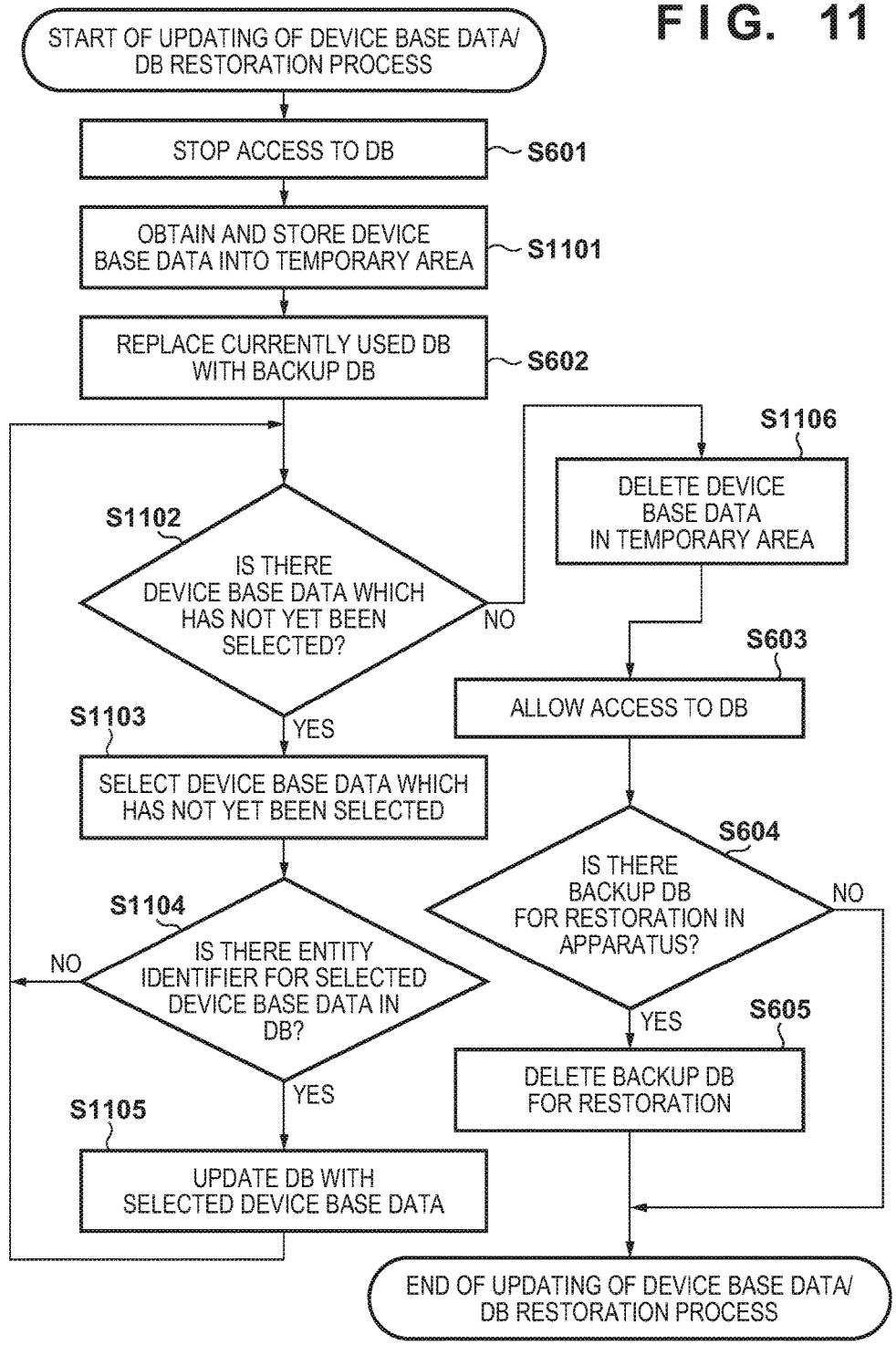
FIG. 11 is a flowchart showing a restoration process which is executed when device base data is updated.

FIG. 11 is a flowchart showing the updating of the device base data and the database restoration process of step S1001 of FIG. 10.

In step S601, as in the description with reference to FIG. 6, the control module 302 requests the data processing module 304 to perform database locking so that a database managed by the data management module 310 cannot be accessed by others. In this embodiment, when the data processing module 304 performs database locking so that the database is not changed, control proceeds to step S1101.

In step S1101, the control module 302 requests the data processing module 304 to save the device base data. The data processing module 304 obtains the device base data from the data management module 310, and saves the device base data into a temporary area of a storage unit, and control proceeds to step S602.

In step S602, as in the description with reference to FIG. 6, the control module 302 requests the data processing module 304 to replace a currently used data base managed by the data management module 310 with a backup database specified in step S501 of FIG. 10. The data processing module 304 replaces the currently used database with the backup database, and control proceeds to step S1102.

In step S1102, the control module 302 determines whether or not there is a device base data that has not yet been selected from the device base data saved in the temporary area, through the data processing module 304. If the determination result is positive, control proceeds to step S1103. Otherwise, control proceeds to step S1106. Note that when step S1102 is executed for the first time, control proceeds to step S1103. In step S1103, the control module 302 selects and designates one of the device base data that has not yet been selected, as a selected one, and control proceeds to step S1104.

In step S1104, the control module 302 obtains an entity identifier contained in the device base data selected in step S1103. The data processing module 304 determines whether or not the entity identifier of the selected device base data is contained in the device base data in the replaced database. If the determination result is positive, control proceeds to step S1105. Otherwise, step S1102 and following steps are repeated.

In step S1105, the control module 302 requests the data processing module 304 to update the database with the device base data selected in step S1103. The data processing module 304 updates the database through the data management module 310 so that the device base data is overwritten using the requested device base data. When the database is updated, step S1102 and following steps are repeated.

In step S1106, the data processing module 304 deletes the device base data saved in the temporary area in step S1101, and control proceeds to step S603. Steps S603-S605 are as described with reference to FIG. 6, and therefore, will not be described.

As described above, even when data updating is performed in addition to the replacement process of a backup database during execution of a restoration process by the data management server application 300, consistency with a database in a replication destination can be maintained. Here, if there is not a difference from a database in a replication destination at the start of the execution of a restoration process, the replication server application 400 may update the device base data after transmitting a backup database. Even in this case, a restoration process can be executed while the consistency is maintained.

Although, in this embodiment, it is assumed that the device base data is saved into the temporary area in step S1101, the present invention is not limited to the device base data. For example, the "device setting data" or the "personalized data" may be saved.

Also, in this embodiment, a backup database is replicated in step S507, and thereafter, update information about the device base data is replicated in step S1004. However, replication may be performed as follows: after the backup database restoration process, the device base data may be updated with the restored database, the updated database file may be duplicated, and the duplicate copy may be designated as data for replication. In such a case, after step S503 of FIG. 10, none of step S505, step S901, and step S507 is executed, and step S1001 is executed. Thereafter, in step S1001, a restoration process is performed, and the device base data is updated. Thereafter, in step S1003, the updated database file is duplicated, and the duplicate copy is designated as data for replication. In step S1004, the replication process is executed using the data for replication. With such a feature, replication to a replication destination is executed only once.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198329, filed Oct. 6, 2016, which is hereby incorporated by reference herein in its entirety.

What is claimed is:

1. A data management system including a first data management apparatus that stores a master database, and a second data management apparatus that stores a replication database synchronous with the master database for replication,
wherein
the first data management apparatus includes
at least one controller configured to function as:
a unit that updates a part of data of the master database, and transmits, to the second data management apparatus, data indicating a difference between before and after the update; and
a unit that obtains backup data for restoring the master database according to a restoration instruction, restores the master database using the obtained backup data, and transmits all data of the restored master database; and
the second data management apparatus includes
at least one controller configured to function as
a unit that updates the replication database on the basis of the received data indicating the difference;
a unit that replaces all data of the replication database with all data of the restored master database, on the basis of the received all data of the restored master database; and
a unit that transmits, to the first data management apparatus, a result of the replacing,
wherein, in a case where the result transmitted to the first data management apparatus indicates that the replacing is successful, replication management information in the first data management apparatus is updated.

2. The data management system according to claim 1, wherein
the at least one controller of the second data management apparatus is further configured to function as:
a unit that determines whether the received data is the data indicating the difference, or the all data of the restored master database, and
when it is determined that the received data is the all data of the restored master database, all data of the replication database is replaced with all data of the restored master database.

3. The data management system according to claim 2, wherein
the at least one controller of the second data management apparatus is further configured to function as:
when it is determined that the received data is the data indicating the difference, the replication database is updated on the basis of the received data indicating the difference.

4. The data management system according to claim 3, wherein
the data indicating the difference is data for updating a portion of the master database and a portion of the replication database.

5. The data management system according to claim 1, wherein
in a predetermined case, after the obtained backup data is transmitted, the master database is restored using the obtained backup data.

6. The data management system according to claim 1, wherein
of the replication management information, update information from previous replication is deleted, and a time of replication is updated with a time of replication based on the transmitted all data of the restored master database.

7. The data management system according to claim 1, wherein
after predetermined data of the master database is saved, the master database is restored using the obtained backup data,
the at least one controller of the first data management apparatus further configured to function as:
a unit that updates the restored master database with the predetermined data; and
a unit that designates the predetermined data as the data indicating the difference, and transmit the data indicating the difference to the second data management apparatus.

8. The data management system according to claim 7, wherein
the predetermined data contains device information about a terminal that is managed by the first data management apparatus.

9. The data management system according to claim 1, wherein
the master database and the backup data correspond to each other.

10. The data management system according to claim 1, wherein
the started replication is performed asynchronously between the first data management apparatus and the second data management apparatus.

11. A data management apparatus that stores a master database, comprising:
at least one controller configured to function as:
a unit that updates a part of data of the master database, and transmits, to another data management apparatus, data indicating a difference between before and after the update; and
a unit that obtains backup data for restoring the master database according to a restoration instruction, restores the master database using the obtained backup data, and transmits all data of the restored master database to the another data management apparatus,
wherein, in a case where the data management apparatus receives from the another data management apparatus a result that indicates successful replacement of data, replication management information in the data management apparatus is updated.

12. An apparatus that stores a replication database synchronous with a master database stored in another apparatus, the apparatus comprising:
at least one controller configured to function as:
a unit that updates the replication database on the basis of data received from the another apparatus indicating a difference of the master database before and after an update of a part of data of the master database;

a unit that, on the basis of receiving all data of a restored master database from the another apparatus, replaces all data of the replication database with all data of the restored master database; and a unit that transmits, to the another apparatus, a result of the replacing.

13. A method executable in a data management system including a first data management apparatus that stores a master database, and a second data management apparatus that stores a replication database synchronous with the master database for replication, the method comprising:

performing in the first data management apparatus updating a part of data of the master database, and transmitting, to the second data management apparatus, data indicating a difference between before and after the update; and obtaining backup data for restoring the master database according to a restoration instruction, restoring the master database using the obtained backup data, and transmitting all data of the restored master database to the second data management apparatus; and performing in the second data management apparatus updating the replicating database on the basis of the received data indicating the difference;

replacing all data of the replication database with all data of the restored master database, on the basis of the received all data of the restored master database; and transmitting, to the first data management apparatus, a result of the replacing, wherein, in a case where the result transmitted to the first data management apparatus indicates that the replacing is successful, replication management information in the first data management apparatus is updated.

14. A method executable in a data management apparatus that stores a master database comprising:

updating a part of data of the master database, and transmitting, to another data management apparatus, data indicating a difference between before and after the update; and obtaining backup data for restoring the master database according to a restoration instruction, restoring the master database using the obtained backup data, and transmitting all data of the restored master database to the another data management apparatus, wherein, in a case where the data management apparatus receives from the another data management apparatus a result that indicates that replacement of data is successful, replication management information in the data management apparatus is updated.

15. A non-transitory computer-readable storage medium storing a program that causes a computer to execute a method of controlling a data management apparatus that stores a master database, the method comprising:

updating a part of data of the master database, and transmitting, to another data management apparatus, data indicating a difference between before and after the update; and obtaining backup data for restoring the master database according to a restoration instruction, restoring the master database using the obtained backup data, and transmitting all data of the restored master database to the another data management apparatus, wherein, in a case where the data management apparatus receives from the another data management apparatus a result that indicates that replacement of data is successful, replication management information in the data management apparatus is updated.

* * * * *